May 21, 1963 R. W. ASTHEIMER 3,090,869
PHOTOSENSITIVE IMAGE MOTION DETECTOR
Filed May 25, 1961 3 Sheets-Sheet 1

*INVENTOR.*
ROBERT W. ASTHEIMER
BY Robert Ames Norton
*ATTORNEY*

United States Patent Office 3,090,869
Patented May 21, 1963

3,090,869
PHOTOSENSITIVE IMAGE MOTION DETECTOR
Robert W. Astheimer, Westport, Conn., assignor to Barnes Engineering Company, Stamford, Conn., a corporation of Delaware
Filed May 25, 1961, Ser. No. 112,687
6 Claims. (Cl. 250—203)

This invention relates to a device for indicating motion of an image from a predetermined central location. In a more specific aspect there is also included a light weight, compact error signal indicator for mobile use.

A number of instruments have been designed which require information, usually in the form of an error signal, when an image of a given target departs from a predetermined position in the instrument. Typical of such instruments are various trackers using infrared or other optical radiations. Extremely accurate and successful trackers have been designed. Typical trackers are described in U.S. Patent No. 2,961,545 and the co-pending application of Monty M. Merlen, Serial No. 16,290, now Patent No. 3,007,053, filed March 21, 1960. These trackers despite their accuracy and effectiveness are fairly heavy and require extensive electrical circuits and elaborate optics. The general type of instrument may be considered as having one or more radiation detectors, a plurality of optical systems to produce images from moving targets and a reticle and mask combination on which the targets are imaged. The output from the detector or detectors is then processed in electronic circuits to yield information with respect to the location of the target image.

A number of uses, principally mobile, have arisen which require simplification and lightening of the error indicating instruments. One particular use is in an instrument for indicating the error or departure from predetermined trajectory of a short range rocket. This problem was worked on extensively in both Europe and the United States and is of particular value for short to moderate range anti-tank rockets which are guided by trailing wires or by other means. This field, while an important one, for the present invention, is merely illustrative and in the specific description of an embodiment of the present invention an instrument for such use will serve as illustration.

The first of the wire controlled rockets were steered to their destination manually. This required extraordinary skill and fast reflexes on the part of the operator thus greatly reducing the practical utility of such rockets. It is possible to use the infrared systems of trackers such as those described in the patent and application above referred to to determine departure of a rocket from desired trajectory, for example line of sight to a tank or other target. The error signals produced may then be used to guide the rocket. However, the known types of trackers are too heavy and complex for mobile use which leaves the requirement for a light and simple instrument still unfulfilled. It is with the solution of this type of problem that the present invention deals.

Referring to the general organization of the instruments in question the present invention is more particularly directed to a reticle and mask combination producing a signal which contains information on the location of the target image with respect to the orthogonal axes of elevation and azimuth. The invention also includes electronic circuits which retrieve this information. One of the basic novelties of the invention lies in reticle mask and information processing and is not concerned with any particular imaging optics. However, incidentally it does permit improvement and simplification in the optics and also in the amount of electronic processing circuits required. It should be understood that while the present invention requires some definite electronic processing the details of the particular circuits used follow standard electronic practice.

In the specific description an instrument for use with flight control short range rockets will be described. Because of the nature of the flare of the rocket engine the best radiations to use are in the fairly near infrared. In its broadest aspects, however, the present invention is not concerned with the use of any particular kind of radiation and includes visible radiations where the target emits them or reflects them and is even usable with ultraviolet radiations although these cases are quite rare.

Essentially the present invention utilizes a reticle which, in the form of a belt or drum, is composed of two inclined parallelograms inclined at supplemental angles to the direction of motions of the reticle. If these parallelograms are produced until they meet they are separated by isosceles triangles, alternate triangles having their apices pointing in opposite directions. The alternate triangles are preferably of uniform transmission. For optimum purposes in order to provide background elimination the transmission should be 50% of the transmission of the transparent portions of the parallelogram. The triangles may be provided with very fine lines but there must not be a pattern which would chop the target at a frequency low enough to interfere with the frequency of the reticle pattern in the parallelograms. The reticle pattern is associated with means, preferably incorporated in the reticle itself, for generating phase reference signals at pattern repetition frequency and at half the repetition frequency. Such signals are obtained by associating segments in a reticle suitably spaced, for example, transparent and opaque segments with a light and phototransistor or any other suitable type of reference generator. The reference phase signals may, of course, be generated from equipment moving in synchronism with the reticle. However, separate generators present no advantages and only add complications, therefore, the provision of reference signal generators by means of patterns on the reticle itself is preferred.

Reference has been made to inclined parallelograms of patterns. Ordinarily these will be of alternate opaque and transparent bars. However, in the extreme the parallelogram can constitute a single bar which has a transmission characteristic for the radiation used the reverse of the separating triangles, that is to say either the triangles are transparent and the parallelograms opaque or vice versa.

The description of the reticle pattern in terms of parallelograms on a belt or drum reticle has been used because of the inherent simplicity of the representation. However, this type of reticle is less desirable for many uses than a rotating disc. When a disc reticle is used the relation of the pattern to the direction of travel is the same, that is to say the inclination of the pattern is a constant. In the case of drum or belt reticles the slope of the parallelograms in rectangular coordinates is $y = kx$. In a rotating disc these relations have to be transferred into polar coordinates and the relationship then becomes $\rho$ equals $k\theta$. As a result the bars are curved in the form of portions of arcs of equal Archimedes spirals. The relation of the pattern to the direction of motion is, of course, the same as in the rectangular coordinates of belt or drum reticles.

Aperture masks have been referred to and they may be rectangular or in the case of discs, if desired, uniformly trapezoidal. When elimination of uniform background is desired the aperture edges across which the pattern moves must conform to the law described and claimed in the copending application of Monty M. Merlen, Serial No. 78,772 filed December 27, 1960, that is to say the edge segments must extend over an integral number of pattern bars. In such a case it is essential that the transmission of the intervening triangles correspond with average transmission of the pattern.

It will be apparent that data with respect to position of a target in elevation and azimuth is developed with a single optical channel, single radiation detector and it is possible in preferred applications to utilize a considerable portion of electronic processing circuits to perform dual functions. This is not to say that it is a requirement of the present invention that only a single radiation detector be used. For example in the specific instrument which will be described there are two detectors and two optical channels. However, they are used to present two different fields of view and the information from elevation and azimuth departure is still obtained from a single detector signal in each case.

The invention will be described in greater detail in conjunction with the drawings in which.

Figure 1:
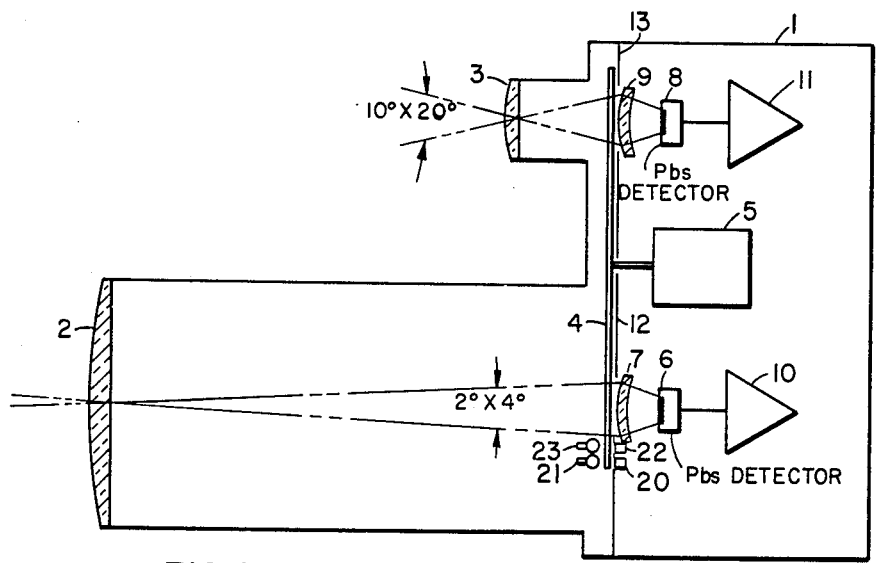
FIG. 1 is a section through the instrument head.

In FIG. 1 the optical head is provided with an aimable casing 1. In this is mounted a long focus, narrow field objective 2 and a short focus, wide field objective 3. As illustrated these fields are 2° x 4° and 10° x 20° respectively. The objectives image anything within their fields of view onto the plane of a reticle 4 which is turned by a reticle drive motor 5 of conventional design. Back of the reticle are located two masks, a narrow field mask 12 and a wide field mask 13. Back of the openings in the masks are field lenses 7 and 9 which image the objective apertures onto detectors 6 and 8. In FIG. 1 these are shown as lead sulfide detectors which are suitable for infrared radiations given off by rocket flares. Other detectors are used for different radiations, for instance phototubes in the visual range.

The detector 6 is connected to a transistor preamplifier 10 and similarly the detector 8 is connected to a preamplifier 11.

Figure 3:
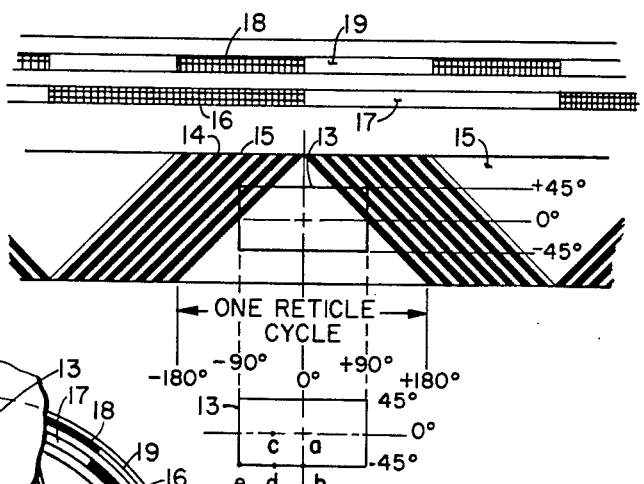
FIG. 3 is a detail view of a portion of the reticle with a pattern shown uncurved for clarity.
Figure 2:
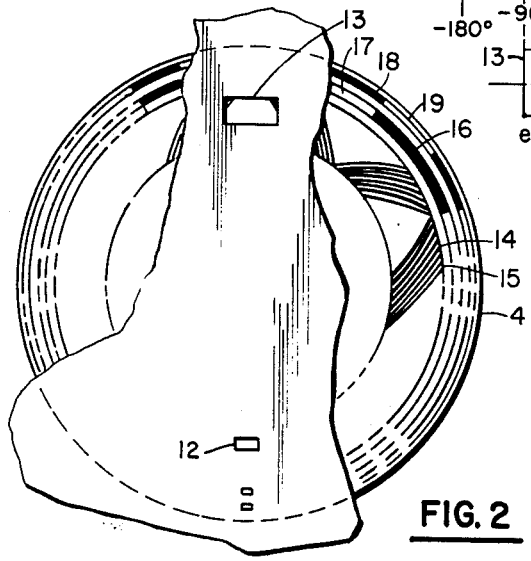
FIG. 2 is a diagrammatic plan view of a reticle.

The reticle is shown in FIG. 2 in its usual preferred form, that of a rotating disc. In FIG. 3 the reticle pattern has been enlarged and has been straightened for clarity showing a pattern which would appear if the reticle were a belt reticle instead of a disc reticle.

The portion of the reticle which passes in front of the two apertures which are diametrically opposed about the reticle circumference is composed of bands of opaque bars 14 and clear bars 15 the bands being at 45° to the reticle travel and at right angles to each other. In FIG. 3 the bands are parallelograms and in FIG. 2 the polar coordinate equivalents, the bars following the equation $\rho = k\theta$. As a result the bands are separated by transmitting triangular segments of the reticle the transmission corresponding to the average of the band, i.e. 50 percent. The coarse aperture mask 13 is illustrated in FIG. 2 and is shown also transposed below the reticle in FIG. 3 for clarity of indicating different positions of a rocket flare image as related to the wave shapes of FIGS. 5 to 7.

Mask apertures are shown having a 2:1 aspect ratio which has been found to be convenient although the invention is not limited to this shape. Since the electrical signals produced by the instrument pass through reticle pattern cycles FIG. 3 shows the extent in terms of electrical degrees, a full cycle being 360°.

On the outer edge of the reticle there are provided two sets of phase reference patterns one being for elevation phase, each opaque section 16 and clear section 17 covering 180 electrical degrees and hence one half pattern cycle frequency. Adjacent is another pattern for azimuth phase reference having similar opaque segments 18 and 19 but only half as long and producing a signal at pattern cycle frequency. Reference signal generation is shown diagrammatically in FIG. 1 with two phototransistors 20 and 22 receiving beams from lights 21 and 23 when a transparent section of the pattern intervenes. These reference pickups produce pulses and are of conventional mechanical and electronic design. They are, therefore, not shown in detail.

In operation the optical head is aimed at the desired target, for example, a moving or stationary tank. When the rocket, the error signal of which is to be indicated, is fired the flare soon comes into the wide field of view. As the rocket continues toward the target it becomes centered in the fine field view through the objective 2 and tracking occurs with greater precision. As will be described below when the target enters the fine field the electronics are switched from the output of the wide field detector to the fine field detector.

Figure 4:
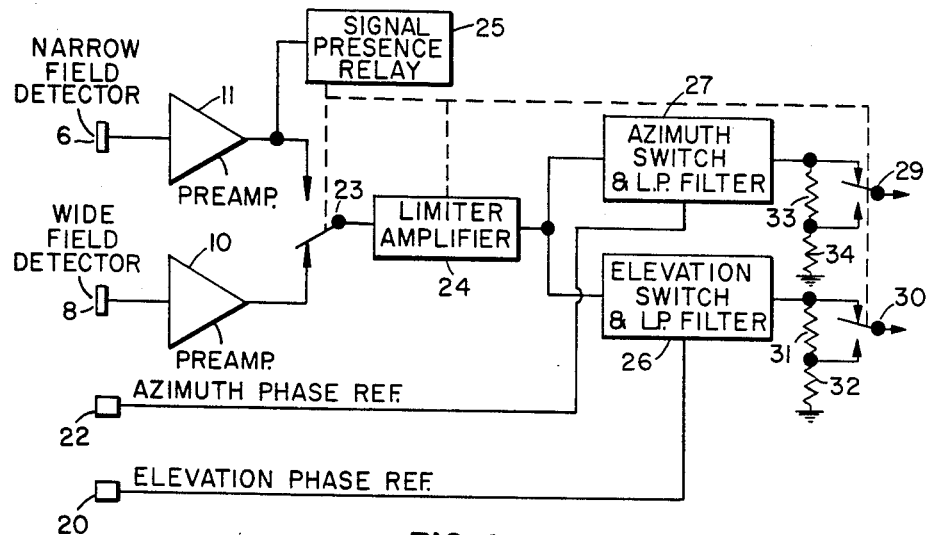
FIG. 4 is a block diagram of the electronics.

Turning now to FIG. 4 it will be seen that the output of the detector 8 is fed to the transistor preamp 11, thence through a switch 23 to a limiter amplifier 24. The output of the limiting amplifier 24 is connected to the elevation switch and filter 26 and the azimuth switch and filter 27. These circuits receive switching pulses from the elevation and azimuth phase pickups 22 and 20 respectively. The outputs of these filters pass through the switches 29 and 30 and constitute the final azimuth and elevation error signals. Because of the low pass filters the final outputs are in the form of D.C. voltages.

Figure 5:
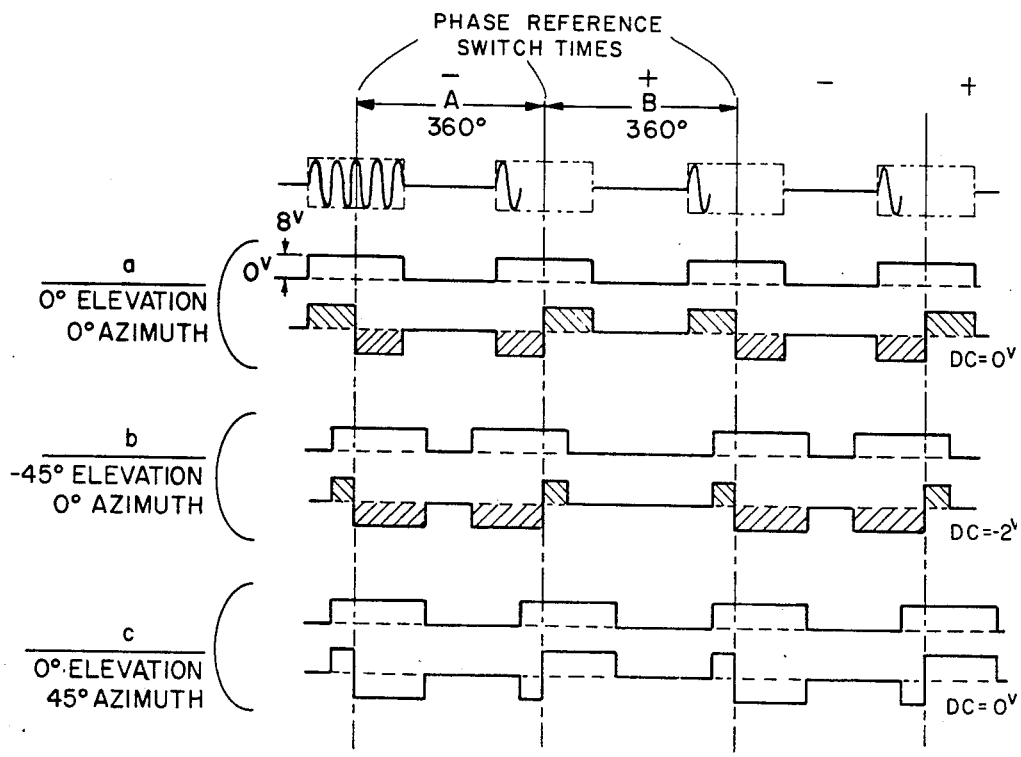
FIG. 5 is a series of wave forms for elevation error signal.

FIG. 5 shows the wave shape for three positions of rocket flare image marked a, b and c which correspond to similarly marked positions on the aperture shown below FIG. 3. Each position is followed by two wave shapes the upper one being the square wave from the phototransistor 22 and the lower one shaped after phase switching. It will be seen that if there is no elevation error (positions a and c), after switching the waves are distributed so that when integrated in the low pass filters they show no net D.C. voltage. Position c clearly shows that an azimuth error while it displaces the square wave in phase does not change the D.C. output. When, however, there is a change in elevation as shown at b the phase switching results in more of the square wave being negative than positive and a net negative D.C. output voltage results. Position b corresponds to an extreme elevation error.

Figure 6:
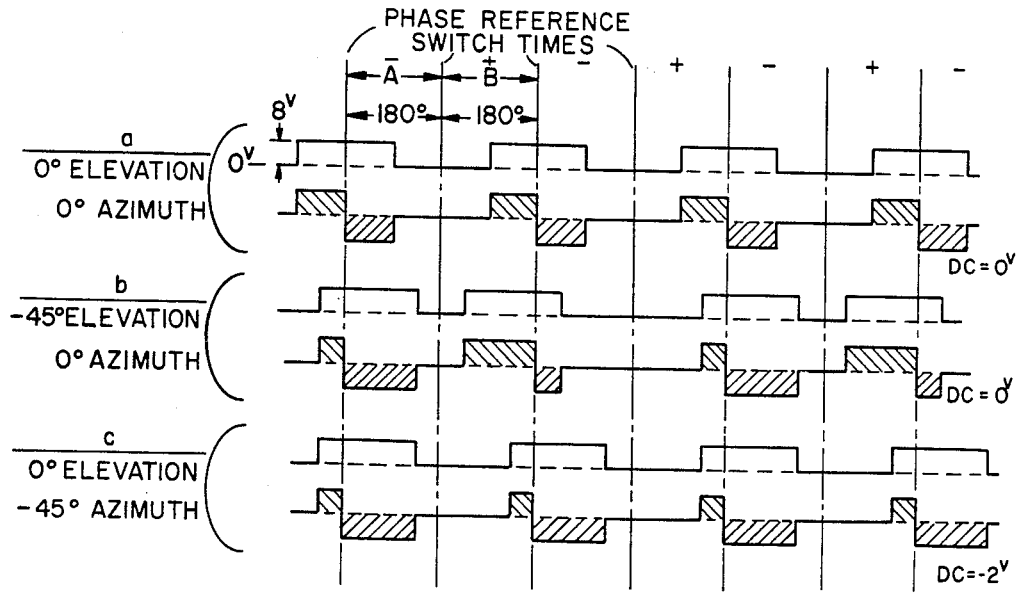
FIG. 6 is a similar representation of wave forms for azimuth error.

FIG. 6 shows a similar situation for azimuth position. This time, however, the phase reference is coming from pickup 20. Again we have a similar situation to FIG. 5. If the rocket flare is centered in azimuth (positions a and b), there will be no D.C. output even though in position b the phase of the square wave has been shifted. In position c, however, there is a change in azimuth and as will be seen there will be a D.C. error signal output.

Figure 7:
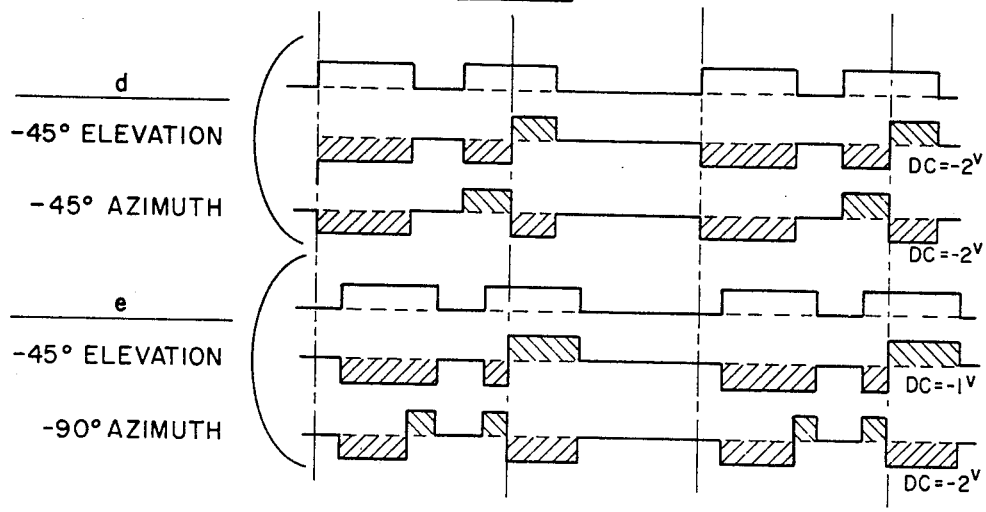
FIG. 7 is a series of wave shapes for combined azimuth and elevation error signals.

FIG. 7 shows two other situations where there is both an elevation and an azimuth error, and it will be seen that this results in a D.C. error output for both coordinates.

It will be noted that the demodulator for azimuth the switch of which is actuated at pattern cycle frequency distinguishes when there is a shift in phase of a square wave signal. The elevation demodulator 26 however operates by reason of a different frequency of rectangular wave pulses occurring at half the frequency of the pattern cycles. It is precisely because the phototransistor 22 generates a signal at one-half the pattern cycle frequency that a phase shift produces a signal. However, each rectangular wave is evenly split as is shown at position c in FIG. 6 and so no azimuth error signal results.

When the rocket flare image approaches the center position it will come into the narrow field of view and so will produce a signal in detector 6 which is amplified in preamp 10. A portion of this output actuates a signal presence relay 25, the relay being provided with further amplification if necessary. This actuates the switches 23, 29 and 30 and also reverses the phase in the limiter amplifier 24. Now the flow of signal goes from preamp 11 to limited amplifier 24 and the output signal from preamp 10 is no longer connected. From now on the narrow field of view takes over and retains the control so long as the rocket does not depart sufficiently from trajectory or the optical head is moved, for example, in following a moving tank, and the image leaves the narrow field. If this occurs the relay 25 is de-energized and the output error signal comes from the wide field detector 8 as was initially described. This connection continues until such time as the image of the rocket flare is once more sufficiently centered to come into the narrow field of view.

In the description of FIG. 1 it has been shown that the narrow field of view is provided with a much larger objective than the wide field objective 3. This is desirable because the image striking the detector 6 might otherwise drop to a figure too near system noise to be reliable. After all the narrow field control is exercised toward the end of the rocket flight when it is furthest away and its energy striking the optical head has diminished.

When there is a switch from the wide field of view to the narrow field of view there will be an excessive jump in error signal output because a given displacement of the target image corresponds to a larger percentage of maximum error signal. Therefore, the switches 29 and 30 cut down the level of the error signal by being connected to the central half of a voltage divider made up of resistances 31 and 32 in one case and 33 and 34 in the other.

It will be seen that by the switching provisions one limiter amplifier and one azimuth and elevation switch and filter is required regardless of whether the instrument is operating with the wide field of view or the narrow field. Thus a considerable portion of the electronic circuits do double duty with the saving in weight and additional compactness.

When the present invention is used in practice it is desirable to make the optical head as light as possible and thus it is often desirable to locate the computer, rocket guidance mechanisms and a considerable portion of the processing electronics at a position remote from the aiming head. This is easily provided by connecting the two portions of the instrument through a suitable cable. Preamplification in the preamps 10 and 11 raise the signal to a point where transmission over a reasonable length of cable can be effected without degradation of performance. The same considerations make it possible to keep the rocket launching site, controllers and most of the electronics hidden from the target. Only a single soldier with the light aiming head needs to be located where there is a clear line of sight to the target. This is an important consideration for the military for use in the case of actual hostilities.

Essentially in the present invention the error signal is developed with respect to two orthogonal axes which have been labelled elevation and azimuth respectively. Obviously, of course, if the optical head is turned through 90°, these two axes become interchanged but if the outputs from the processing circuits or the inputs to telemetry to the rocket are likewise interchanged the instrument operates in exactly the same manner. Therefore, the invention is not limited to aiming the instrument in such a way that elevation error signals are produced from demodulator 26 and azimuth signals from demodulator 27. However, it is so common to use these designations in trackers that they have been employed in the present description.

Essentially the operation of the error signal indicator is to aim visually on the target. When the rocket is then fired, with or without preliminary rough manual guidance, its flare comes into the wide angle field of view and generally when nearly centered on the trajectory comes into the narrower field of view. Departure from the center of the fields of view results in an error signal giving both elevation and azimuth information. This signal may be used by instrumentation, such as simple computers, to cause the rocket to change its flight until it is in the trajectory toward the target. The present invention is not concerned with this additional information processing and may be said to cease once the error signal has been produced.

I claim:

1. An instrument for producing an error signal corresponding to motion of a target image comprising in combination and in optical alignment a radiation detector, a reticle and mask combination and optical means for imaging a target onto the plane of the reticle, the reticle having thereon a repetitive pattern and mask combination comprising a moving reticle formed of bands inclined to the direction of reticle pattern movement at supplementary angles separated by areas transmitting the radiation used, two reference signal generators operating in synchronism with the movement of the reticle pattern across the mask aperture, one producing a signal at pattern repetition frequency and the other ta one-half pattern repetition frequency, whereby a signal from the radiation detector in the form of rectangular waves is produced, synchronous rectification means actuated by each of the reference signal generators, electronic processing circuits including limiters interposed between detector output and synchronous rectification input whereby the two synchronous rectifiers demodulate the signal producing demodulated signals proportional to the departure of target image from a center position on the reticle in two orthogonal directions.

2. An instrument according to claim 1 in which the reticle provides straight pattern motion and the pattern bands are inclined parallelograms.

3. An instrument according to claim 1 in which the reticle is a rotating disc and the pattern bands are composed of bars of segments of equal Archimedes spirals.

4. An instrument according to claim 3 in which the mask is provided with an aperture window the window edges past which the reticle pattern moves being inclined to the elements thereof and composed of at least one segment, each segment extending over an integral number of pattern elements and the transmitting elements transmit uniformly at the average transmission of the pattern bands.

5. An instrument according to claim 3 for producing error signals on the departure from line of sight of a trajectory of a self-luminous missile comprising in combination two radiation detectors, two parallel optical systems, one reticle and two aperture windows at different locations with respect to said reticle pattern, one aperture window providing a wide field of view and one narrow.

6. An instrument according to claim 5 in which at least a portion of the electronic processing circuits between detector and demodulator are common and means controlled by the presence of signal on the detector behind the narrow field of view for switching the synchronous rectifying demodulator from wide field of view detector to narrow field of view detector and vice versa.

References Cited in the file of this patent

UNITED STATES PATENTS

| | | |
|---|---|---|
| 2,524,807 | Kallmann | Oct. 10, 1950 |
| 2,772,479 | Doyle | Dec. 4, 1951 |
| 2,961,545 | Astheimer et al. | Nov. 22, 1960 |
| 3,007,053 | Merlen | Oct. 31, 1961 |